United States Patent

[11] 3,629,038

| [72] | Inventors | Kunio Satake<br>Kawasaki-shi;<br>Tomiho Sone, Yokohama; Minoru<br>Hamada, Kawasaki-shi, all of Japan |
|---|---|---|
| [21] | Appl. No. | 795,032 |
| [22] | Filed | Jan. 29, 1969 |
| [45] | Patented | Dec. 21, 1971 |
| [73] | Assignee | Asahi Kasei Kagyo Kabushiki Kaisha<br>Osaka, Japan |
| [32] | Priority | Feb. 2, 1968 |
| [33] | | Japan |
| [31] | | 43/7166 |

[54] METHOD FOR BONDING RUBBER COMPOSITION TO METAL
10 Claims, No Drawings

[52] U.S. Cl............................................................. 156/245,
156/110, 156/306, 161/225
[51] Int. Cl............................................................. B29c 19/00
[50] Field of Search.............................................. 156/110,
110 A, 306, 242, 309, 245, 334, 335; 260/845;
161/31.2, 225

[56] References Cited
UNITED STATES PATENTS

| 3,262,482 | 7/1966 | Clifton et al. | 156/335 X |
|---|---|---|---|
| 3,294,866 | 12/1966 | Soldatos | 156/335 X |
| 3,331,804 | 7/1967 | Fogiel | 156/335 X |
| 3,354,107 | 11/1967 | Hamed | 156/335 X |

Primary Examiner—Carl D. Quarforth
Assistant Examiner—Stephen J. Lechert, Jr.
Attorney—Waters, Roditi, Schwartz & Nissen ABSTRACT: An adhesive rubber composition comprising a rubber composition consisting essentially of ethylene-propylene terpolymer, sulfur, vulcanization accelerators, a halogenated alkylphenol-formaldehyde resin or alkylphenol-formaldehyde resin together with a metal chloride is shaped into a desired form, placed upon a metal and bonded to the metal by vulcanization; or the adhesive rubber composition is placed between a rubber composition consisting essentially of said terpolymer and a metal, both being shaped in desired forms in advance as an intermediate layer, and the rubber composition and the metal are bonded together by vulcanization. The present bonding method is applicable to the manufacture of car tires, shock absorbers, cables, belts and other industrial articles.

METHOD FOR BONDING RUBBER COMPOSITION TO METAL

This invention relates to a method for bonding a rubber composition to a metal, and more particularly to a method for bonding a rubber composition consisting essentially of a rubberlike terpolymer of ethylene, propylene and a termonomer, the terpolymer being obtained by terpolymerization of ethylene, propylene and a small amount of a termonomer, to a metal. The rubberlike terpolymer will be hereinafter referred to as "EPDM" in the present specification.

Bonding rubber to metal is very important position in the manufacture of car tires, for example, bonding a rubber to bead wires, and the preparation of such industrial articles as shock absorbers, cables, and belts. EPDM contains a small number of double bonds within the molecule, and is nonpolar as well as chemically very inactive. Thus, EPDM has not heretofore been satisfactory in bonding of a metal in the conventional method as employed in bonding such highly unsaturated rubbers as natural rubber, SBR, etc., to a metal. Accordingly, the development of a technique for bonding EPDM to a metal has been deemed important for solving an industrial problem as to whether or not EPDM can be used in the manufacture of car tires and other industrial articles.

Several methods have been heretofore proposed for bonding EPDM to a metal: one method is based on the utilization of halogenated EPDM as an adhesive in the same manner as a halogenated butyl rubber is used to bond a butyl rubber to a metal (Belgian Pat. No. 648,665 and British Pat. Specification No. 1273198); another method is based on the utilization of an organic polyisocyanate or perchlorinated rubber and chlorosulfonated olefin polymer (U.S. Pat. No. 3179554); and other methods are based on utilization of EPDM, which is graft-polymerized with such vinyl monomers as 4-vinyl-pyridine and methacrylic acid, or the utilization of a mixture of the said grafted EPDM and halogenated EPDM.

However, these conventional methods have such disadvantages as excessively high cost, impractically complicated procedure or poor bonding effect contrary to expectations.

On of the objects of the present invention is to provide a method for bonding a rubber composition consisting essentially of EPDM to a metal with a satisfactory bonding force without incurring these disadvantages.

According to the present invention, a rubber composition consisting essentially of EPDM can be bonded to a metal in the following manners: An adhesive composition is prepared by adding to a rubber composition consisting essentially of EPDM, a vulcanizing agent, that is, sulfur, vulcanization accelerators and a halogenated alkylphenol formaldehyde resin, or alkylphenol-formaldehyde resin together with a metal chloride; the mixture is shaped in a desired form; then placed upon a metal shaped in the desired form; and vulcanized to thereby bond the shaped adhesive composition to the shaped metal. In another embodiment, an adhesive composition is prepared by adding to a rubber composition consisting essentially of EPDM, a vulcanizing agent, that is, sulfur, a vulcanization accelerator, and a halogenated alkylphenol-formaldehyde resin, or alkylphenol-formaldehyde resin together with a metal chloride in the same manner as above; the mixture is placed as an intermediate layer between a rubber composition consisting essentially of EPDM and a metal, both being shaped in advance into desired forms; and vulcanized to thereby bond the shaped rubber composition to the shaped metal.

The halogenated akylphenol-formaldehyde resin or alkylphenol-formaldehyde resin has been heretofore used as a resin vulcanizing agent for butyl rubber or EPDM (U.S. Pat. No. 2701895), but in the present invention, they are used not for vulcanization but for adhesion, as set forth in example 2 which follows. In the present invention, the halogenated alkylphenol-formaldehyde resin or the alkylphenol-formaldehyde resin brings about a practically satisfactory bonding effect upon a metal.

The rubber composition consists essentially of EPDM. The EPDM as referred to in the present invention is a terpolymer consisting 20 to 99 mol percent of propylene, 80 to 1 mol percent of ethylene, and 0.1 to 20 mol percent termonomer per 100 mol percent of propylene and ethylene. The termonomer includes cyclopentadiene, 1,4-hexadiene, methyltetrahydroindene, bicyclopentadiene, 5-methylene-2-norbornene, etc. The rubber composition contains, in addition to EPDM, carbon black usually used in ordinary rubber compositions, silica, aluminum silicate, or other conventional fillers, plasticizers, softeners or factice, pigments and antioxidants, if required. These additives are added to the EPDM in the following proportions: 30 to 300 parts by weight of carbon black, 30 to 150 parts by weight of silica, aluminum silicate or other conventional fillers, zero to 150 parts by weight of plasticizers, zero to 10 parts by weight of softeners or factice, zero to 10 parts by weight of pigments and zero to five parts by weight of antioxidants per 100 parts by weight of EPDM.

The adhesive rubber composition used in the present invention consists of 100 parts by weight of EPDM, one to 10 parts be weight of a vulcanizing agent, that is, sulfur, 0.1 to three parts by weight of vulcanization accelerators, five to 20 parts by weight, preferably 10 to 15 parts by weight of a halogenated alkylphenol-formaldehyde resin or alkylphenol-formaldehyde resin together with one to five parts by weight of a metal chloride in addition to the said additives.

The halogenated alkylphenol-formaldehyde resin used in the present invention consists essentially of a compound having a structure as represented by the following formula:

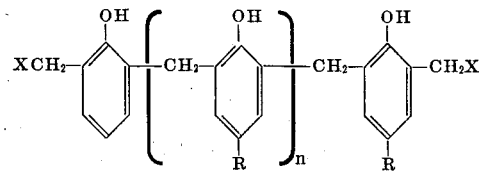

wherein $n$ is an integer from one to six, X is a halogen atom such as bromine or chlorine, and R is a hydrogen atom or an alkyl group having one to six carbon atoms, and further the resin includes such derivatives as are by the following formula:

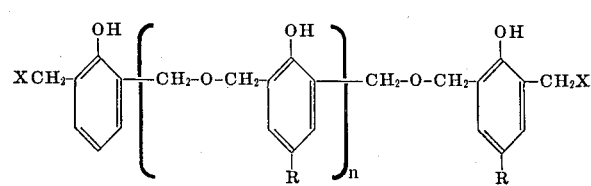

wherein $n$, X and R are as defined above.

The alkylphenol-formaldehyde resin used in the present invention consists essentially of a compound having the same structure as said halogenated alkylphenol-formaldehyde resin wherein the X of the $XCH_2$ group is replaced with an OH group.

AS vulcanization accelerators, the well-known vulcanization accelerators used in sulfur vulcanization of EPDM can be used in the present invention. For example, tetramethylthiuram disulfide having the following formula:

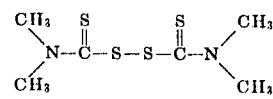

or a metal salt of dithiocarbamic acid having the following formula:

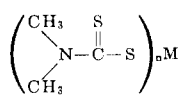

wherein M is a metal selected from the group consisting of Fe, Sn and Zn, and $n$ is an integer from two to four and has the same number as the valency which M has, and mercaptobenzothiazole having the following formula:

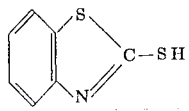

can be suitably used in combination in the present invention.

The metal chloride used together with the alkylphenol-formaldehyde resin in the present invention includes stannous chloride, zinc chloride, ferric chloride, etc.

The metals to be bonded include a metal used as bead wires in car tires, and usually includes iron, copper, tin and alloy of these metals or with other metals. Further, it is preferable to apply a bronze galvanization of copper and tin to the metals other than copper and tin before the metals are subjected to the present bonding procedure.

In order to increase the bonding effect, one to 10 parts by weight of a halogenated polymer, for example, polychloroprene or chlorinated polyethylene may be added to the adhesive rubber composition of the present invention per 100 parts by weight of EPDM.

The adhesive rubber composition is shaped into a desired form, as it is; directly placed upon a metal also shaped in the desired form; and bonded to the metal by heating and vulcanization.

The vulcanization is carried out in the present invention by a vulcanizing press wherein the vulcanization is effected under a pressure of 10 to 100 kg./cm.$^2$, preferably 20 to 60 kg./cm.$^2$ at a temperature of 100° to 200° C., preferably 150° to 180° C., or by injection molding wherein the vulcanization is effected at a vulcanization temperature of 160° to 200° C., under an injection pressure of 800 to 1200 kg./cm.$^2$ and a mold pressure of 300 to 500 tons. In the latter case, the injection molding is carried out, after the metal piece to be bonded has been inserted into the mold.

In order to bond a rubber composition consisting essentially of EPDM to a metal using said adhesive rubber composition as an intermediate layer therebetween, any of the following procedures may be used in the present invention.

1. Between a rubber composition consisting essentially of EPDM and a metal, both being shaped into desired forms in advance, there is inserted a shaped sheet of said adhesive rubber composition having a thickness of 0.5 to 3 mm., and then bonding is carried out by heating and vulcanization according to the conventional method.

2. An adhesive cement prepared by adding five to 30 parts by weight of said adhesive rubber composition to 100 parts by weight of a hydrocarbon solvent such as n-heptane or cyclohexane and dissolving the former into the latter is applied onto the surface of a metal in a desired form, and then a rubber composition consisting essentially of EPDM, which is shaped into a desired form in advance, is placed on the adhesive cement applied on the metal, and the bonding is carried out by heating and vulcanization according to the conventional method.

When a rubber composition consisting essentially of EPDM is bonded to a metal according to the present invention, an excellent, satisfactorily practicable bonding effect can be attained compared with that of the conventional method, and the bonding itself can be carried out more readily.

In preparing a tire from a rubber composition consisting essentially of EPDM, the bead wires can be satisfactorily bonded to the bead insulation rubber according to the present invention.

The present invention is hereunder illustrated, in the following examples. Parts or percentage in the examples are by weight unless otherwise indicated.

EXAMPLE 1

| | |
|---|---|
| EPDM consisting of 60 to 65 mol % of ethylene, 40 to 35 mol % of propylene and 2.4 mol % of 1,4-hexadiene per 100 mol % of ethylene and propylene: Mooney viscosity ML 1+4, 100° C. 91) | 100 parts |
| HAF black | 70 parts |
| Process oil | 10 parts |
| Zinc oxide | 5 parts |
| Sulfur | 4 parts |
| Vulcanization accelerator TT (tetramethylthiuram disulfide) | 1.5 parts |
| Vulcanization accelerator M (mercaptobenzothiazole) | 0.5 part |
| Tackyrol 250 (a trade mark for brominated alkylphenol-formaldehyde resin, manufactured by Sumitomo Kagaku Kogyo K.K. Japan) | 10 parts |

In an adhesive rubber composition consisting essentially of EPDM and having the above-mentioned composition was embedded a 0.94 mm. dia. steel wire, to whose surface was applied a bronze galvanization of 98 percent copper and 2 percent tin in advance, and bonding was carried out by press vulcanization at 160° C. for 60 minutes. A rubber block containing an embedded steel wire was obtained after having been left standing for 24 hours. The force required to withdraw the steel wire from the thus obtained rubber block was determined by means of a tensile testing machine at a tensile speed of 200 mm./min., and thus obtained result is shown in table 1.

EXAMPLE 2

| | |
|---|---|
| EPDM (Same as in example 1) | 100 parts |
| HAF black | 70 parts |
| Process oil | 10 parts |
| Zinc oxide | 5 parts |
| Sulfur | 4 parts |
| Vulcanization accelerator TT (tetramethylthiuram disulfide) | 1.5 parts |
| Vulcanization accelerator M (mercaptobenzothiazole) | 0.5 part |
| Tackyrol 201 (a trade mark for alkylphenol-formaldehyde resin manufactured by Sumitomo Kagaku Kogyo K.K.) | 10 parts |
| Stannous chloride | 2 parts |

In an adhesive rubber composition consisting essentially of EPDM and having the above-mentioned composition was embedded the same steel wire as in example 1, and a tensile test was conducted in the same manner as in example 1. The thus obtained result is shown in table 1.

For comparison purposes, the following tests were conducted:

COMPARISON TEST 1

| | |
|---|---|
| EPDM (same as in example 1) | 100 parts |
| HAF black | 70 parts |
| Process oil | 10 parts |
| Zinc oxide | 5 parts |
| Sulfur | 4 parts |
| Vulcanization accelerator TT (tetramethylthiuram disulfide) | 1.5 parts |
| Vulcanization accelerator M (mercaptobenzothiazole) | 0.5 part |

COMPARISON TEST 2

| | | |
|---|---|---|
| EPDM (same as in example 1) | | 100 parts |
| HAF black | | 70 parts |
| Process oil | | 10 parts |
| Zinc oxide | | 5 parts |
| Tackyrol 201 | | 10 parts |
| Stannous chloride | | 2 parts |

In compositions consisting essentially of EPDM and having the above-mentioned compositions were embedded the same steel wires, and the tensile tests were conducted in the same manner as in example 1. The thus obtained results are shown in table 1.

TABLE 1

| | Example 1 | Example 2 | Comparative Test 1 | Comparative Test 2 |
|---|---|---|---|---|
| Bonding force (kg./3.5 cm.) | 106 | 100 | 59 | 52 |

It is evident from the results shown in table 1 that the present invention provides an excellent bonding force as compared with the methods based on vulcanization using sulfur or alkylphenol-formaldehyde resin singly as a vulcanizing agent.

EXAMPLE 3

The adhesive rubber composition consisting essentially of EPDM and having the same composition as in example 1 was shaped into a sheet having a thickness of 1 mm. by means of 6-inch rolls, and the same steel wire as used in example 1 was wrapped with the thus prepared sheet. The wrapped wire was embedded in a rubber composition consisting essentially of EPDM and having the following composition:

| | |
|---|---|
| EPDM (same as in example 1) | 100 parts example |
| HAF black | 70 parts |
| Process oil | 1 10 parts |
| Zinc oxide | 5 parts |
| Sulfur | 4 parts |
| Vulcanization accelerator TT (tetra-methylthiuram disulfide) | 1.5 parts |
| Vulcanization accelerator M (mercapto-benzothiazole) | 0.5 part |

Bonding was effected by press vulcanization at 160° C. for 60 minutes, and then the bonding force was determined in the same manner as in example 1. The thus obtained result is shown in table 2.

EXAMPLE 4

Fifteen parts of the adhesive rubber composition consisting essentially of EPDM and having the same composition as in example 1 were dissolved in 100 parts of n-heptane, and the thus obtained solution was applied to the same steel wire as used in example 1, and after the applied wire was dried, the wire was embedded in the same rubber composition consisting essentially of EPDM as in example 3. The bonding was effected by press vulcanization at 160° C. for 60 minutes, and the bonding force was determined in the same manner as in example 1. The thus obtained result is shown in table 2.

TABLE 2

| | Example 3 | Example 4 |
|---|---|---|
| Bonding force (kg./3.5 cm.) | 99 | 95 |

We claim:
1. A method for bonding a rubber composition consisting essentially of a terpolymer consisting of 20 to 99 mol percent of propylene, 80 to 1 mol percent of ethylene and 0.1 to 20 mol percent of a suitable termonomer per 100 mol percent of propylene and ethylene, to a metal, which comprises adding sulfur, vulcanization accelerators and a halogenated alkylphenol-formaldehyde resin or an alklyphenol-formaldehyde resin together with a metal chloride to the rubber composition consisting essentially of said terpolymer, shaping the resulting adhesive rubber composition to a desired form, placing the shaped rubber adhesive composition upon the metal and effecting bonding by heating and vulcanization.

2. A method for bonding a rubber composition consisting essentially of a terpolymer consisting of 20 to 99 mol percent of propylene, 80 to 1 mol percent of ethylene and 0.1 to 20 mol percent of a suitable termonomer per 100 mol percent of propylene and ethylene, to a metal, which comprises adding sulfur, vulcanization accelerators and a halogenated alkylphenol-formaldehyde resin or an alkylphenol-formaldehyde resin together with a metal chloride to the rubber composition consisting essentially of said terpolymer, placing the resulting adhesive rubber composition between the rubber composition consisting essentially of said terpolymer and the metal as an intermediate layer, both being preliminarily shaped into desired forms and bonding the rubber composition to the metal by heating and vulcanization.

3. A method according to claim 2, wherein the adhesive rubber composition is in the form of a sheet having a thickness of 0.5 to 3 mm.

4. A method according to claim 2, wherein the adhesive rubber composition is in the form of a solution consisting of five to 30 parts by weight of said adhesive rubber composition and 100 parts by weight of a hydrocarbon solvent.

5. A method according to claim 1, wherein the adhesive rubber composition is prepared by adding to 100 parts by weight of the terpolymer, one to 10 parts by weight of sulfur, 0.1 to three parts by weight of the vulcanization accelerators, five to 20 parts by weight of the halogenated alkylphenol-formaldehyde resin or alkylphenol-formaldehyde resin together with one to five parts of the metal chloride.

6. A method according to claim 2 wherein the adhesive rubber composition is prepared by adding to 100 parts by weight of the terpolymer, one to 10 parts be weight of sulfur, 0.1 to three parts by weight of the vulcanization accelerators, five to 20 parts by weight of the halogenated alkylphenol-formaldehyde resin or alkylphenol-formaldehyde resin together with one to five parts of the metal chloride.

7. A method according to claim 1 wherein the termonomer is cyclopentadiene, 1,4-hexadiene, methyltetrahydroindene, bicyclopentadiene or 5-methylene-2-norbornene.

8. A method according to claim 2 wherein the termonomer is cyclopentadiene, 1.4-hexadiene, methyltetrahydroindene, bicyclopentadiene or 5-methylene-2-norbornene.

9. A method according to claim 1 wherein the metal chloride is stannous chloride, zinc chloride or ferric chloride.

10. A method according to claim 2 wherein the metal chloride is stannous chloride, zinc chloride or ferric chloride.

* * * * *

UNITED STATES PATENT OFFICE
CERTIFICATE OF CORRECTION

Patent No. 3,629,038     Dated December 21, 1971

Inventor(s)  Kunio Satake, et al

It is certified that error appears in the above-identified patent and that said Letters Patent are hereby corrected as shown below:

On the cover [73] the name of the Assignee should read -- Asahi Kasei Kogyo Kabushiki Kaisha --. [32], priority date should read -- February 7, 1968.

Signed and sealed this 7th day of November 1972.

(SEAL)
Attest:

EDWARD M. FLETCHER, JR.                ROBERT GOTTSCHALK
Attesting Officer                      Commissioner of Patents